Aug. 24, 1937.        A. TETREAULT        2,090,649
INDEXING ATTACHMENT FOR SLOTTING MACHINES
Filed Sept. 16, 1936        2 Sheets-Sheet 1

Inventor:
Amos Tetreault
by Robert A. Lavender
Attorney

Patented Aug. 24, 1937

2,090,649

UNITED STATES PATENT OFFICE 2,090,649

INDEXING ATTACHMENT FOR SLOTTING MACHINES

Amos Tetreault, Newport, R. I.

Application September 16, 1936, Serial No. 101,073

1 Claim. (Cl. 90—44)

(Granted under the act of March 3, 1883, as amended April 30, 1928; 370 O. G. 757)

This invention relates to slotting machines and it has a particular relation to indexing attachments for feeding the work toward the cutting tool automatically and in uniform amounts.

The principal object of this invention is the provision of an indexing device of the character described which is actuated by the movement of the cutter head for automatically feeding the work uniformly toward the cutting tool predetermined amounts with each stroke of the cutter head.

Another object of the invention is the provision of a device of the type referred to which may be adjusted to vary the amount that the work is fed toward the cutter and which may quickly and easily be removed to permit of a manual operation of the feeding mechanism.

With these and other objects in view, as well as other advantages that may be incident to the use of the improvements, the invention consists in the parts and combinations thereof hereinafter set forth and claimed, and with the understanding that the several necessary elements constituting the same may be varied in proportion and arrangement without departing from the nature and scope of the invention, as defined in the appended claim.

In order to make the invention more clearly understood, there are shown in the accompanying drawings, means for carrying the invention into practical use, without limiting the improvements in their useful application to the particular construction, which, for the purpose of explanation, have been made the subject of illustration.

Figure 1:
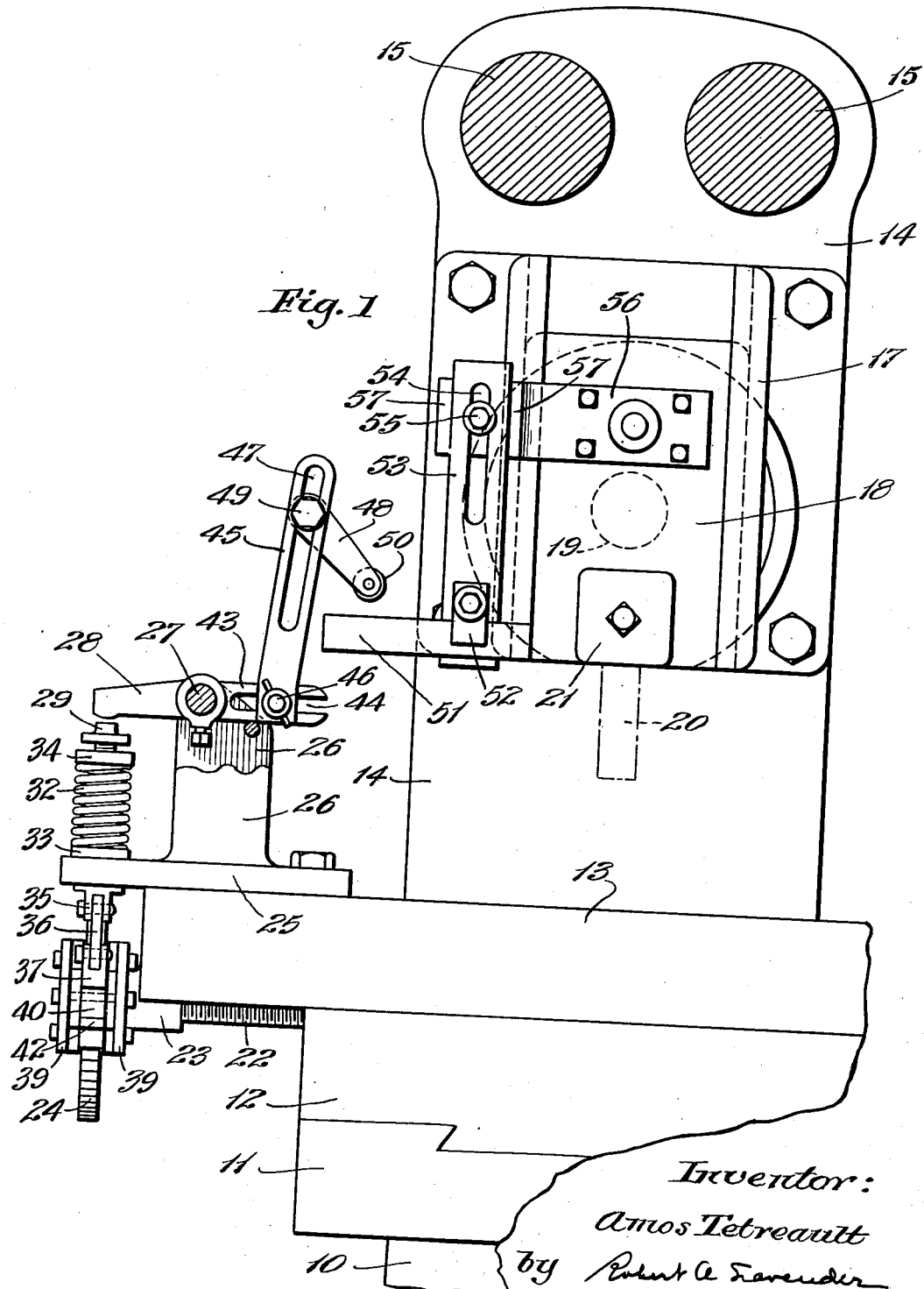
Figure 2:
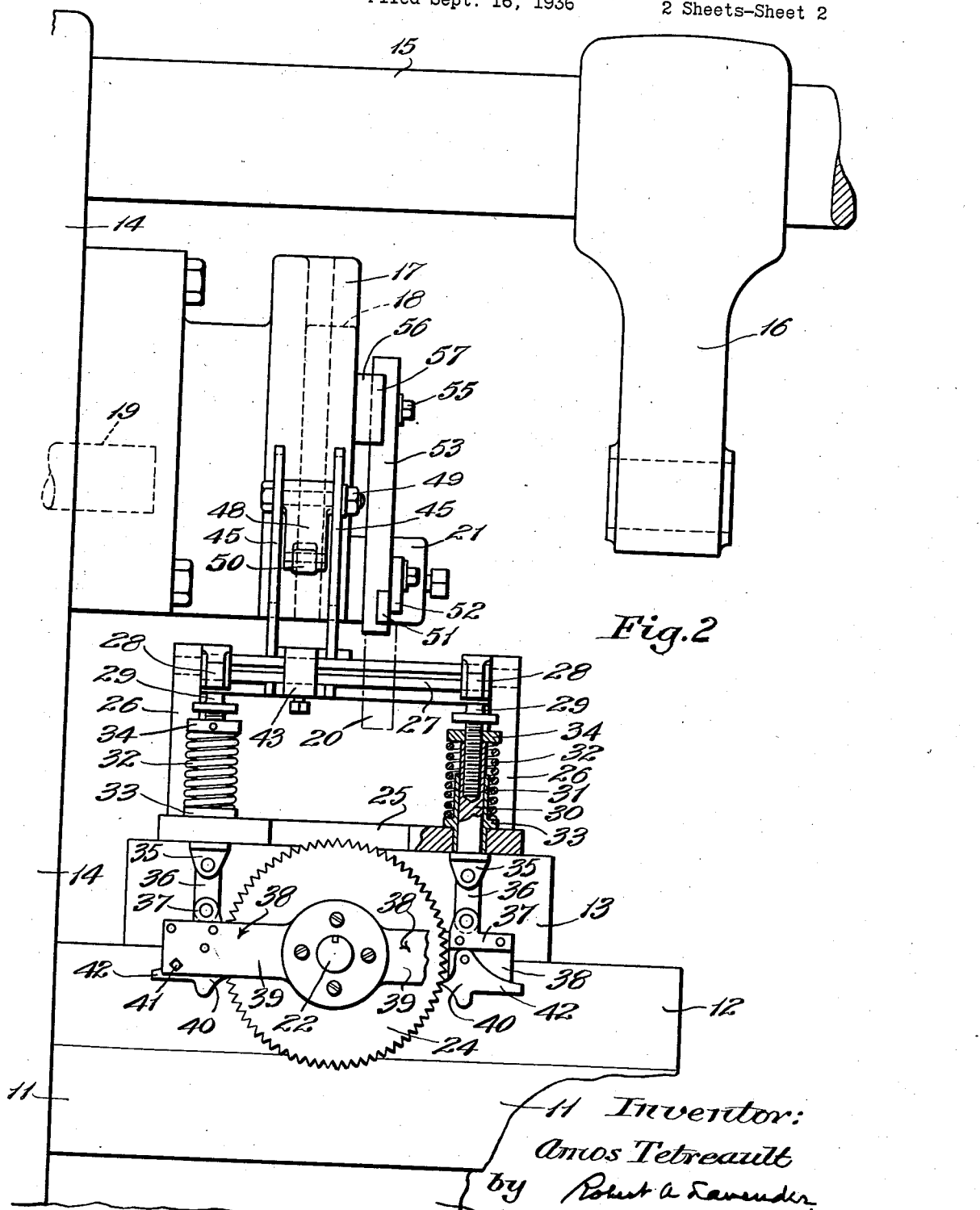

In the accompanying drawings:

Fig. 1 is a side elevational view of an indexing device embodying the invention, the slotting machine upon which the device is mounted being illustrated schematically; and Fig. 2 is a front elevational view of the structure shown in Fig. 1 with certain parts shifted laterally from their operative positions for the purpose of clearness.

Referring to the drawings, a slotting machine and improved indexing device is shown as comprising a base 10 having a knee 11 mounted for vertical adjustment thereon. A cross feed base 12 is mounted for sliding movement in a transverse direction on the knee 11 and has a main work carrier table 13 slidably mounted thereon for longitudinal movement. The base 10 is provided with the usual vertical column 14, over arms 15 and arbor yoke 16, which latter is not employed when the present attachment is in use.

Secured to one of the pedestals 14 is a guide member 17 within which a cutter head 18 is mounted for vertical reciprocation. This head is actuated in the usual manner by a suitable crank mechanism (not shown) driven by a spindle 19 mounted in the column 14, and carries a cutting tool 20 which is removably secured thereto by means of a clamp 21. The table 13 may be moved horizontally in order to feed the work clamped thereon toward and away from the reciprocating tool 20, by means of a screw 22, one end of which is threaded into the cross feed base 12 and the other end of which is journalled in a bearing 23 carried by the table 13. The screw 22 is usually provided with a hand crank or wheel by means of which the table 13 and work may be fed manually toward and away from the cutting tool 20, but in the present instance such hand crank is removed and replaced by a ratchet wheel 24, the hub of which is suitably interlocked with the bearing 23 so that the longitudinal movement of the screw in either direction will be transmitted to the table. This ratchet wheel constitutes a part of the indexing device which will now be described.

Fixed to the table 13 in overhanging relation to the front edge thereof is a bed plate 25 provided with a pair of vertically extending laterally spaced bearing posts 26. A rock shaft 27 is journalled at its ends in the posts 26 and constitutes the support for a pair of lever arms 28 which are fixed thereto, one adjacent to each of the posts 26. Each of these arms overhangs a stem 29 which is screw threaded into the upper end of a rod 30 slidably mounted for vertical movement in a guide sleeve 31 fixed in the overhanging portion of the bed plate 25. The stem 29 and rod 30 are urged toward their uppermost positions by a coil spring 32 encircling these posts between a collar 33 provided on the guide 31 and a lock nut 34 threaded onto the stem 29 for engagement with the upper end of the rod 30. The lower ends of the rods 30 extend a short distance below bed plate 25 and are each provided with a yoked lower extremity 35 which is connected by a link 36 with a block 37 secured to the outer end of a bifurcated laterally extending lever 38, the arms 39 of which straddle the ratchet wheel 24 and are mounted for vertical swinging movement on the screw 22. A pawl 40 is pivotally mounted between the arms 39 of each of the levers 38 adjacent to the outer ends thereof for engagement with the teeth of the ratchet wheel 24. Either or both of the pawls 40 may be held out of engagement with the ratchet wheel 24 by spring actuated latch pins 41 which are mounted in the levers 38 for releasable engagement with tail pieces 42 formed on each of the pawls 40.

The levers 38 and pawls 40 carried thereby are oscillated vertically in order to intermittently rotate the ratchet wheel 24 and screw 22 in either a clockwise or counter-clockwise direction, depending upon which of the pawls is in engagement with the ratchet wheel, by means of a lever arm 43, which is fixed to the shaft 27 intermediate its ends and which is provided with a slot 44 within which a pair of vertically extending arms 45 are adjustably secured by a clamping bolt 46. The arms 45 are also provided with slots 47 within which a rearwardly extending arm 48 is adjustably secured by a clamping bolt 49. The rear end of the arm 48 is provided with a roller 50 for engagement by a forwardly extending bar 51 which is adjustably secured by a clamp 52 to the lower end of a vertically extending plate 53. This plate is provided with a slot 54 adjacent to its upper end for adjustable engagement by a clamping bolt 55 fixed to the forward end of a horizontal bar 56 which is bolted to the vertically reciprocating cutter head 18. The bar 56 is formed with a guide flange 57 at its forward end for engagement by the plate 53 so as to prevent the latter from tilting in operation.

From the foregoing, it will be apparent that upon each upward stroke of the cutter head 18 and tool 20, the bar 51 will engage the roller 50 and swing the lever mechanism consisting of the arms 48, 45, 43 and 28, in a counter-clockwise direction, as viewed in Fig. 1, and depress the stems 29 and rods 30 against the action of the springs 32. This movement of the stems 29 and rod 30 will swing the arms 38 and pawls 40 downwardly and rotate the ratchet wheel 24 in either a clockwise or counter-clockwise direction depending upon which of the pawls 40 is operative and which is not. If, for example, the right hand pawl 40 is in operative engagement with the ratchet wheel 23 and the left hand pawl is held inoperative by its locking pin 41, the ratchet wheel 24 and screw 22 will be turned in a clockwise direction so as to feed the table and work clamped thereon toward the cutter 20, the bar 51 entering between the spaced arms 45. The downward movement of the cutter head 18 will release the roller 50 and permit the lever mechanism and parts associated therewith to be returned to their initial positions under the action of the springs 32. The degree of rotation of the ratchet wheel 24 and screw 22 may be regulated by adjusting the throw of the lever mechanism through the several slotted connections described.

An indexing device constructed as above described may be so adjusted as to obtain very fine and accurate cuts of uniform depth and completely eliminates the element of uncertainty present in machines in which the work is fed manually.

The invention may be modified in proportion and arrangement of the parts by those skilled in the art without departing from the nature and scope of the invention as defined in the appended claim.

The invention described herein may be manufactured and used by or for the Government of the United States of America for governmental purposes without the payment of any royalties thereon or therefor.

I claim:

In combination with a slotting machine having a reciprocating head for carrying a cutting tool and a table movable in a direction transverse to that of the movement of the head and cutting tool for supporting the work, together with screw threaded means for moving said table, an indexing device for automatically feeding work toward said cutting tool comprising a ratchet wheel fixed to said screw threaded means, pawl mechanism for rotating said ratchet wheel, a plunger slidably mounted on said table for operating said pawl mechanism, a shaft journalled on said table, a lever arm on said shaft for actuating said plunger, a second lever arm on said shaft, and means on said reciprocating head for swinging said second lever with each stroke of said head.

AMOS TETREAULT.